United States Patent
Chu et al.

(10) Patent No.: US 9,326,234 B2
(45) Date of Patent: Apr. 26, 2016

(54) SUB-1GHZ GROUP POWER SAVE

(71) Applicant: STMicroelectronics, Inc., Coppell, TX (US)

(72) Inventors: Liwen Chu, San Ramon, CA (US); George A. Vlantis, Sunnyvale, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 520 days.

(21) Appl. No.: 13/710,282

(22) Filed: Dec. 10, 2012

(65) Prior Publication Data

US 2013/0155930 A1    Jun. 20, 2013

Related U.S. Application Data

(60) Provisional application No. 61/576,884, filed on Dec. 16, 2011.

(51) Int. Cl.
*H04W 52/02* (2009.01)
*H04W 52/14* (2009.01)

(52) U.S. Cl.
CPC ...... *H04W 52/0206* (2013.01); *H04W 52/0219* (2013.01); *Y02B 60/50* (2013.01)

(58) Field of Classification Search
CPC .......... H04W 52/0219; H04W 52/143; H04W 52/0206; Y02B 60/50
See application file for complete search history.

(56) References Cited

U.S. PATENT DOCUMENTS

| | | | |
|---|---|---|---|
| 2008/0123577 A1* | 5/2008 | Jaakkola et al. | 370/311 |
| 2009/0010191 A1* | 1/2009 | Wentink | 370/311 |
| 2010/0189021 A1* | 7/2010 | He et al. | 370/311 |
| 2010/0265864 A1* | 10/2010 | He et al. | 370/311 |
| 2011/0103280 A1* | 5/2011 | Liu et al. | 370/311 |
| 2012/0120931 A1* | 5/2012 | Abraham et al. | 370/338 |
| 2012/0303137 A1* | 11/2012 | Schoeller et al. | 700/1 |
| 2013/0010664 A1* | 1/2013 | Kang et al. | 370/311 |
| 2014/0198723 A1* | 7/2014 | Gong et al. | 370/328 |
| 2015/0049660 A1* | 2/2015 | Kwon et al. | 370/311 |

* cited by examiner

*Primary Examiner* — Andrew Lai
*Assistant Examiner* — M Mostazir Rahman
(74) *Attorney, Agent, or Firm* — Allen, Dyer, Doppelt, Milbrath & Gilchrist, P.A.

(57) ABSTRACT

Methods and systems are disclosed for reduced power consumption in communication networks, including sensor networks implemented according to IEEE 802.11ah, by organizing stations into groups having long sleep periods. By organizing the stations of the network into groups, the access point can match each group's traffic identification map with its target beacon transmit time. One embodiment organizes the stations sequentially by AID numbers. Other embodiments organize the stations by similar power save requirements and/or nearby geographical location. Forms of an Extended Traffic Identification Map are matched with an awaken Target Beacon Transmit Time of the group.

11 Claims, 3 Drawing Sheets

| ELEMENT ID | LENGTH | DTIM COUNT | DTIM PERIOD | BITMAP CONTROL | PARTIAL VIRTUAL GROUP BITMAP |
|---|---|---|---|---|---|
| OCTETS: 1 | 1 | 1 | 1 | 2 | 1-251 |

EXTENDED TIM2
OPTION A

| ELEMENT ID | LENGTH | DTIM COUNT | DTIM PERIOD | BITMAP CONTROL | PARTIAL VIRTUAL GROUP BITMAP |
|---|---|---|---|---|---|
| OCTETS: 1 | 1 | 1 | 1 | 3 | 1-251 |

EXTENDED TIM3
OPTION B

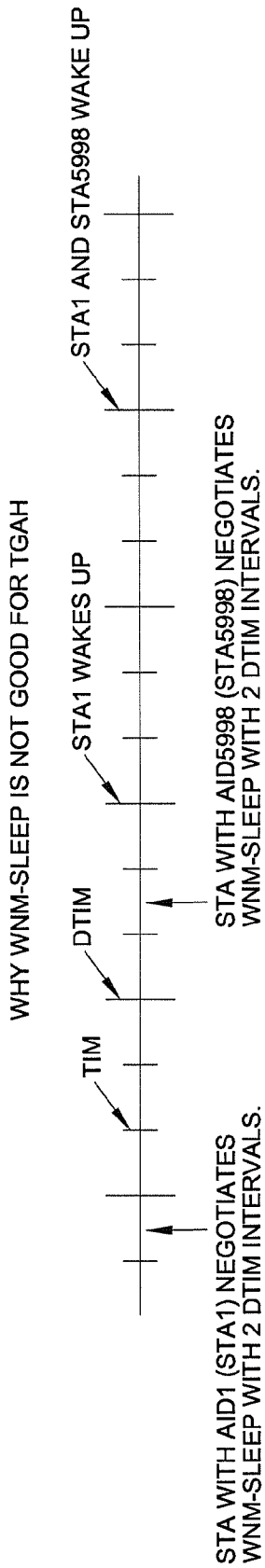
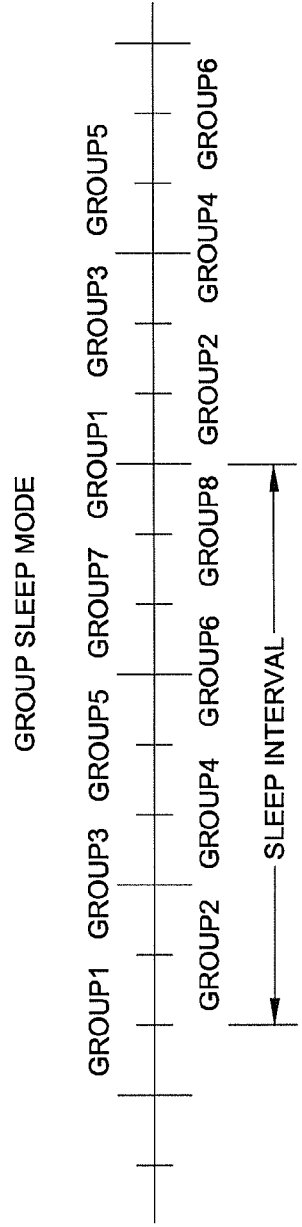
Fig. 1
Prior Art
Fig. 2

| ELEMENT ID | LENGTH | DTIM COUNT | DTIM PERIOD | BITMAP CONTROL | PARTIAL VIRTUAL GROUP BITMAP |
|---|---|---|---|---|---|
| 1 | 1 | 1 | 1 | 2 | 1-251 |

OCTETS:

EXTENDED TIM2
OPTION A

| ELEMENT ID | LENGTH | DTIM COUNT | DTIM PERIOD | BITMAP CONTROL | PARTIAL VIRTUAL GROUP BITMAP |
|---|---|---|---|---|---|
| 1 | 1 | 1 | 1 | 3 | 1-251 |

OCTETS:

EXTENDED TIM3
OPTION B

Fig. 3

SUB-1GHZ GROUP POWER SAVE

CROSS-REFERENCE TO RELATED APPLICATION

This application claims the benefit of U.S. Provisional Application Ser. No. 61/576,884 filed Dec. 16, 2011. The disclosure of the foregoing United States Patent Application is specifically incorporated herein by this reference.

BACKGROUND OF THE INVENTION

1. Field of the Invention

The present invention relates, in general, to methods and systems of wireless networks, especially methods for reducing power consumption by stations of the network. More particularly, the invention relates to, but is not limited to, Power saving methods for wireless sensor and metering networks operating in the Sub 1 GHz band, especially networks using the emerging IEEE standard 802.11ah.

2. Relevant Background

There is a clear need to save power in devices in communications networks and, particularly, in mobile devices in wireless networks. The particular cases of wireless networks implementing the IEEE 802.11 a/b/e/g/n standards have specified time windows in which the stations of the network can save power by entering a sleep mode, in which most of the components of a device are turned off according to a known schedule.

A more recent amendment to the 802.11 standard was developed in the 802.11v amendments. One of the features added therein was the WNM—sleep mode (Wireless Network Management). It extends the allowable sleep time for a STA before disconnect by AP.

However, the particular cases of wireless sensor and metering networks present several problems with using the known sleep modes. The data might only need to be transmitted infrequently. The sensors could have very stringent power saving requirements, needing even longer sleep periods. Most important, there could be a large number (e.g., 6000) of STAs in a sensor network; if too many were to wake at the same time, they could all contend for medium access (e.g., sending PS-Poll frames) at the same time. This could result in signal collisions, causing network inefficiency and wasting power at the STAs as signals are repeated.

In order to meet these challenges, the Institute of Electrical and Electronics Engineers (IEEE) organized a task group (TGah) to develop methods and standards for communication networks using radio transmissions in the Sub 1 GHz frequency range, 902 to 928 MHz. One advantage of this frequency range is that it allows greater range and suffers less interference from intervening objects. Another advantage is that by using the new frequency range, there is no need to maintain compatibility with previous standards, so the types and forms of the frames can be optimized for efficiency.

3. Glossary and Acronyms

As a convenient reference in describing the invention herein, the following glossary of terms is provided. Because of the introductory and summary nature of this glossary, these terms must also be interpreted more precisely by the context of the Detailed Description in which they are discussed.

ACK Acknowledgement
AID Association Identification
AP Access Point
APSD Automatic Power Save Delivery
ARP Address Resolution Protocol
BSS Basic Service Set
DMS Direct Multicast Service
DTIM Delivery Traffic Identification Map
E_TIM Extended TIM
FMS Flexible Multicast Service
MAC Medium Access Control
MPDU MAC Protocol Data Unit
PHY Physical signaling layer
TBTT Target Beacon Transmit Time
TIM Traffic Identification Map
WNM Wireless Network Management

SUMMARY OF THE INVENTION

The present invention discloses alternative methods of sleep modes for communication networks, including, but are not limited to, wireless sensor networks implementing the IEEE 802.11ah standard. Other applications include, but are not limited to, communication networks based on a central access point (AP) communicating with several stations (STAs) or devices.

In one set of embodiments, the AP allocates its associated stations into different groups, on the basis of sequential order of the stations' AID numbers. The groups can have long sleep intervals, and the stations within a group wake up simultaneously to receive beacons from the AR By having the groups have separate wake times, the AP is able to handle large numbers of stations. See FIG. 2.

Further, in various embodiments, new, modified forms of a standard Traffic Identification Map (TIM) can be used, in which either the Bitmap Control field is set to two octets (and called an Extended TIM2) when the TIM's group is implicitly indicated, or set to three octets (and called an Extended TIM3) when the TIM's group is explicitly indicated. When the STAs are grouped by sequential AID numbers, each STA belongs to only one group.

In yet further embodiments, group management information is transmitted by the AP in Group Power Save Elements, which can be included in management frames such as a Beacon, Probe Response, or an Association Response management action frame. Alternatively, Group Power Save Elements can be transmitted in a dedicated Group Power Save Management action frame, as shown in FIG. 4.

Once a station receives a Group Power Save Element, the station compares its AID with the Starting AID and the Ending AID of the Group Power Save Element. If the station's AID is in the scope defined by the Starting AID and the Ending AID, the station is in the group defined by the Group Power Save Element. The Wakeup Target Beacon Transmit Time (TBTT), and the Group Sleep Interval define when the station will wake up. By having the groups have separate wake times, the AP is able to handle large numbers of stations. See FIG. 2. Further, these embodiments can use the Extended TIM forms.

In a second set of embodiments, the AP allocates its associated stations into different groups on the basis of the sequential order of the stations' AID numbers, and wherein the stations in a group also have similar power requirements as defined by the STA type, e.g., sensor or offloading. The groups can have long sleep intervals, and the stations within a group wake up simultaneously to receive a beacon from the AP. By having the groups have separate wake times, the AP is able to handle large numbers of stations. See FIG. 2. Further, these embodiments can use an Extended Traffic Identification Map, in which the Bitmap Control field is set to two octets when the TIM's group is implicitly indicated or set to three octets when the TIM's group is explicitly indicated. In these embodiments, each STA belongs to only one group.

In a third set of embodiments, the AP allocates its associated stations into different groups on the basis of the sequential order of the stations' AID numbers, and wherein the stations in a group also have similar nearby geographical location. The groups can have long sleep intervals, and the stations within a group wake simultaneously to receive the beacon from the AP. Further, these embodiments can use the Extended TIMs, as described above.

BRIEF DESCRIPTION OF THE DRAWINGS

FIG. 1 shows how using the WNM-Sleep mode of the prior art standard IEEE 802.11v could lead to problems in a wireless network having a large number of stations, for example, a large scale sensor network with 6000 stations.

FIG. 2 shows an embodiment of the sleep mode of the current invention, in which the stations are grouped into a smaller number of groups. In the example shown, there are eight groups.

FIG. 3 shows organizations of the fields within two embodiments of an Extended TIM, according to embodiments of the current invention.

DETAILED DESCRIPTION OF THE PREFERRED EMBODIMENTS

Figure 4:
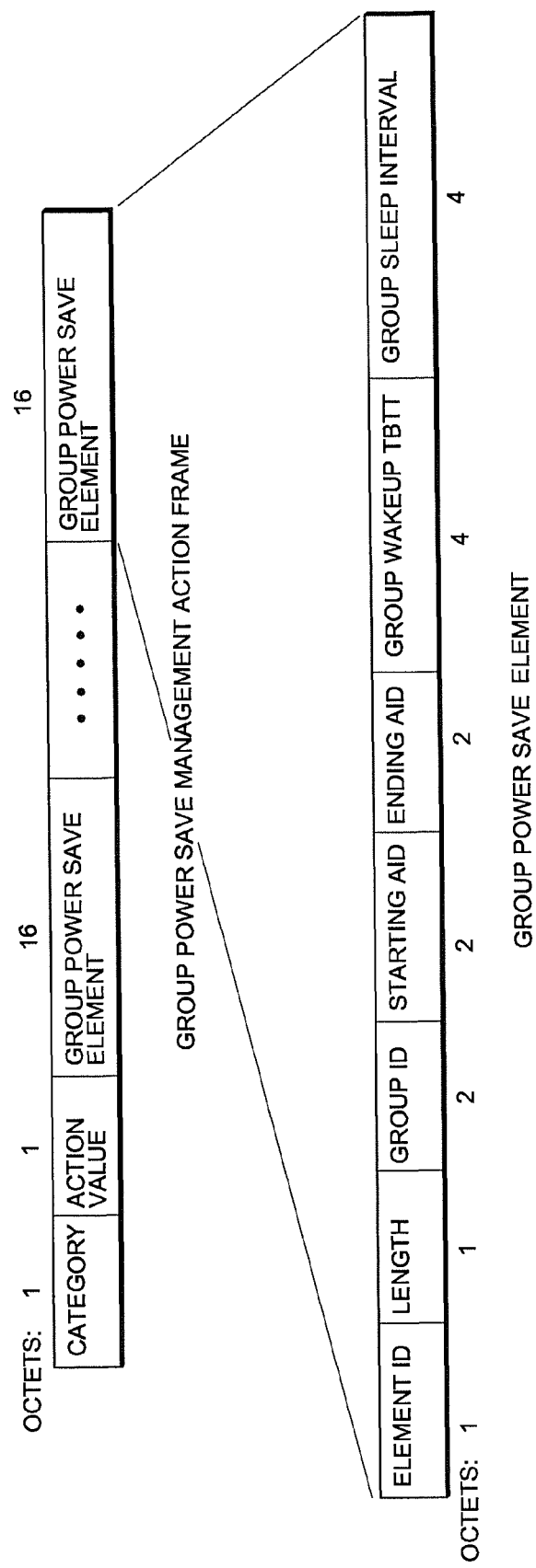
FIG. 4 shows the organization of the fields of a Group Power Save Management action frame, and subfields of the Group Power Save Element in one embodiment of the invention.

In the description and claims that follow, the word "a" or "an" preceding an element does not exclude the presence of a plurality of such elements.

Communication networks, including wireless networks, often transmit information by digitizing the information and organizing the digital form into specific sequences of blocks, called frames. The frames include "header fields" for proper addressing of the transmitted signal, for synchronization of the devices in the network, and for various other tasks needed to operate the network. The background knowledge of frame transmission that is assumed in this disclosure is that of the IEEE 802.11 standard, through amendment 802.11v. It is included by reference for terminology and background information about frame transmission, and does not imply that the communication networks of this disclosure necessarily use the physical wireless transmission methods described therein.

Communication networks, particularly wireless sensor networks, have a need to conserve power. This is often accomplished by having stations enter sleep modes, in which at least a part of the station is turned off Methods for operating networks that have sleep modes must also specify how and when the devices are to resume full power operation.

The 802.11 a/b/e/g/n standards include PS-Poll based methods for coordinating sleep modes. An AP transmits beacon frames periodically, each including a TIM element. The TIM element indicates whether there are buffered frames in the AP for the power save STAs. A power save STA wakes up to receive the beacon and transmits a PS-Poll frame to trigger the AP to transmit a frame to the power save STA. The 802.11 a/b/e/g/n standards include an automatic power save delivery (APSD) method. An AP can transmit multiple frames when it receives a trigger frame from a power save STA. The AP and a power save STA can also negotiate a periodic wake up time. During the negotiated wakeup time, the AP does not need to receive the trigger frames before it transmits the buffered frames to the power save STA.

The standard IEEE 802.11v extends the sleep mode methods of 802.11 a/b/e/g/n and provides for a Wireless Network Management (WNM) sleep mode by which a non-AP STA signals to the AP that it will be sleeping for a specified length of time, defined as a number of DTIM intervals. The standard also specifies Flexible Multicast Service (FMS) to enable a non-AP STA to wake up at alternate DTIM intervals, rather than every DTIM. The standard also specifies a Direct Multicast Service (DMS) to enable a STA to request the AP to transmit group addressed frames destined to the requesting STA as individually addressed frames.

Although WNM-Sleep methods allow a power save STA to sleep for a longer time, for sensor networks with hundreds, even thousands, of STAs, the WNM-Sleep could present problems. Consider the case of a network with 6000 STA (sensors). First, with WNM-Sleep, the TIM beacon may need to be as big as 6000/8=750 bytes. Second, if all STAs in the BSS use WNM-Sleep to sleep a longer time, beacon intervals other than DTIM beacon intervals are rarely used. The problem is that DTIM beacon intervals are the only beacon intervals at which the WNM-Sleep STAs can wake up. Third, all the power save STAs will try to send PS-Poll frames if the TIM element indicates that there are buffered frames for them. This may increase the transmission collisions and waste the power. A typical beacon interval is 100 ms. In a beacon interval of 100 ms, the network could not finish all 6000 STAs polling the AR Considering that each STA would need a 100 byte MPDU and 14 bytes for an ACK message, and at 200 kbps, a poll of a single station would need 114*8/200,000=4.56 msec. So less than 25 stations could poll the AP, without even considering the backoff, and PHY header overhead. These considerations are illustrated in the time line shown in FIG. 1. The DTIM beacon interval is three beacon intervals. STA1 whose AID is 1 negotiates successfully with the AP that it uses a WNM-Sleep method with two DTIM beacon intervals as its wake up interval. After that STA1 will wake up every two DTIM beacon intervals to receive the TIM elements in the DTIM beacons. STA2 whose AID is 5998 negotiates successfully with the AP that it uses a WNM-Sleep method with two DTIM beacon intervals as its wake up interval. After that, STA2 will wake up every two DTIM beacon intervals to receive the TIM elements in the DTIM beacons. STA1 and STA2 will contend with each other after they receive the TIM indicating that there are buffered frames for them. The non-DTIM beacon intervals will be idle. When there are hundreds, even thousands, of stations, the likelihood of collisions becomes high, and the inefficiency of leaving idle the non-DTIM beacon intervals becomes clear.

In order to allow widespread and efficient implementation of wireless sensor networks, it has been proposed to use the unlicensed frequency band of 902 MHz to 928 MHz in the United States, identified as the "Sub-1 GHz band". One advantage of using that frequency band is that there is no need to ensure backwards compatibility with previous versions of the 802.11 standard; i.e., Sub-1 GHz can implement "greenfield" technology. So the new information elements for the BSS management can be invented and optimized, if need be, for sensor networks. Also, the frame structure of earlier (/a/b/e/g/n) standards can be changed and optimized, if need be, for sensor networks.

FIG. 2 shows how the first family of embodiments of the invention, which is group sleep mode, overcomes the problems with using WNM-Sleep methods in a sensor network. The various stations are arranged into groups; the example shown in FIG. 2 shows eight groups. Each group has its own sleep interval and awaken group beacon interval identified by a group Target Beacon Transmission Time (TBTT). The terms "sleep interval" and "group beacon interval" are used interchangeably in this application. The group beacon interval can be any beacon interval. The STAs in a group only wake up at their own group beacon interval to receive the beacon and TIM element within the beacon. During group beacon intervals other than their own group beacon interval, the STAs in the group will go to sleep. By arranging the groups to have different awaken times, a much smaller set of stations will contend for medium access (i.e., backoff, transmit trigger frames etc.), so there will be fewer collisions. The TIM element will also become shorter.

In a second family of embodiments of the invention, sleep times of stations are managed by organizing the stations in the basic service set (BSS) into groups according to the Association Identifier (AID) number of each STA. In such an embodiment, the group consists of STAs whose AID numbers form a sequence. By doing so, the AP is able to reduce the TIM length since the information it must transmit in the TIM is reduced to just the Start AID (lowest AID number in the group) and the End AID (highest AID number in the group), instead of a full set of AID numbers that the AP can associate. In this set of embodiments, each STA is arranged to belong to only one group in the set of groups.

In a further embodiment of the invention, a modified form of a standard TIM element is used for traffic indication of a group. Called an Extended TIM2 (E_TIM2), it has its Bitmap Control field extended to be two octets when the TIM's group is implicitly indicated. The group serviced by the beacon is implicitly indicated by the TBTT of the beacon. When the Sleeping Interval of the group is such that value of "Wakeup TBTT"+"Sleeping Interval"*N, where N is an integer, is the same as a beacon's TBTT, then the group is serviced by the beacon. One implementation of the fields for the Extended TIM2 is shown in FIG. 3, as Option A. In this embodiment, the beacon of each beacon interval only indicates whether the STAs from exactly one group implicitly indicated by the beacon TBTT have buffered frames, and the group should wake up to receive the TIM. So the Group ID field that identifies the wakeup STAs can be removed to make the Extended TIM2. The Element ID field can include a special value to indicate that the TIM element is an Extended TIM2 element. The Length field indicates the length of the Extended TIM2 element, excluding the lengths of the Element ID field and Length field. The DTIM Count field indicates the remaining beacon intervals until the AP transmits the next DTIM beacon. The DTIM Period field indicates the length, in beacon intervals, of a DTIM Period.

The Bitmap Control field contains the Bitmap Offset in the group. Bit 0 of the Bitmap Control field contains the Traffic Indicator bit associated with AID 0. The remaining 15 bits of the field form the Bitmap Offset. The value 0 of the remaining 15 bits of the field is matched to the Starting AID of the group. The AIDs that are smaller than the AID expressed by the Bitmap Control field will not be in the Partial Virtual Group Bitmap field of the Extended TIM2 element, and the AP does not have the buffered frames for those AIDs. Each bit in the Partial Virtual Bitmap field indicates whether the AP has buffered frames for the STA whose AID is identified by the AID expressed by the Bitmap Control field plus the bit position in Partial Virtual Bitmap.

In another embodiment, a second modified and extended form of a standard TIM element is used. Called an Extended TIM3, it has its Bitmap Control field extended to be three bytes, and the intended group of the Extended TIM3 is explicitly indicated within the Extended TIM3 element. One implementation of the fields for the Extended TIM3 is shown in FIG. 3, as Option B. In this embodiment, an Extended TIM3 for one group can be included in a beacon. In this embodiment, the Extended TIM3s for multiple groups can also be included in a beacon, where each Extended TIM3 indicates whether the STAs from the respective group have buffered frames, since the Group ID is included in the Extended TIM3 element within the Bitmap Control field. The Element ID field includes a special value to indicate that the element is the Extended TIM3 element. The Length field indicates the length of the element, excluding the lengths of the Element ID field and the Length field. The DTIM Count field indicates the remaining number of beacon intervals until the AP transmits the next DTIM beacon. The DTIM Period field indicates the length, in beacon intervals, of a DTIM Period.

The 3-octet form of the Bitmap Control field comprises the Group ID subfield and Group Bitmap Control subfield. In a preferred embodiment, the first octet is used for the Group ID subfield, and octets 2 and 3 for the Group Bitmap Control field. The Group ID subfield indicates to which group the Extended TIM3 corresponds. The Group Bitmap Control subfield indicates the bitmap offset in the group, with the value 0 to indicate the minimal AID value of the group. The AIDs that are smaller than the AID expressed by the Group Bitmap Control subfield will not be in the Partial Virtual Group Bitmap field of the Extended TIM3 element. Each bit in the Partial Virtual Group Bitmap indicates whether the AP has buffered frames for the STA whose AID is identified by the AID expressed by the Group Bitmap Control subfield plus the bit position in Partial Virtual Group Bitmap. With the help of the Group ID subfield, an AP can indicate whether the STAs from more than one group have buffered frames.

In another embodiment of the invention, a Group Power Save Element can be used to transmit group management information from the AP to the STAs, such as the Starting AID and the Ending AID of a group, the Group Wakeup TBTT and the Group Sleep Interval. An implementation of the Group Power Save Element is shown in FIG. 4. The Starting AID field is the minimal AID value of the group and the Ending AID field is the maximal AID value of the group. These two fields decide the total number of stations in a group. The Group Wakeup TBTT indicates the target wakeup time of the group at which the AP transmits the beacon that includes the group's Extended TIM2 or Extended TIM3. The Group Sleep Interval indicates the period between two Group Wakeup TBTTs. The STAs in a group will wake at a beacon's TBTT when the beacon's TBTT is equal to the value of [Group Wakeup TBTT+N* Group Sleep Interval], where N is an integer, for the group's Group Wakeup TBTT and Group Sleep Interval. The Group Power Save Element may be transmitted in a management frame such as a Beacon, Probe Response, or Association Response management action frame.

Another embodiment uses a new specific, dedicated management action frame, called a Group Power Save Management action frame, to transmit group management information. The Group Power Save Management action frame is shown in FIG. 4. In the embodiment shown, there is a Category field and an Action Value field, followed by a plurality of Group Power Save Elements. In a preferred embodiment, the first two fields have size 1 octet each.

In a third family of embodiments, the AP allocates its associated stations into different groups, on the basis of the sequential order of the stations' AID numbers, wherein the stations in a group have similar power requirements as defined by the STA type, e.g., sensor or offloading. So the stations with the similar power requirements have sequential AID values and are allocated to the same group. This third family of embodiments can use the same Extended TIM2 element, Extended TIM3 element, Group Power Save element or Group Power Save Management action frame, as explained above in the second family of embodiments in which group allocation was only by sequential AID values.

In a fourth family of embodiments, the AP allocates its associated stations into different groups, on the basis of the sequential order of the stations' AID numbers, wherein the stations in a group have nearby positions, where nearby means that the STAs can detect each other's transmissions. The stations with nearby positions have sequential AID values and are allocated to the same group. When the STAs with nearby positions are allocated to the same group, the hidden node problem can be avoided. Collisions created by hidden nodes are avoided. This family of embodiments can use the same Extended TIM2 element, Extended TIM3 element, Group Power Save element or Group Power Save Management action frame, as explained above for the second family of embodiments in which group allocation was only by sequential AID values.

In a fifth family of embodiments, the AP allocates its associated stations into different groups, on the basis of the sequential order of the stations' AID numbers, wherein the stations in a group have both nearby positions and similar power save requirements. So the stations with the similar power requirements and nearby positions have AID values and are allocated to the same group. This family of embodiments can use the same Extended TIM2 element, Extended TIM3 element, Group Power Save element and Group Power Save Management action frame, as explained above for the second family of embodiments in which group allocation was only by sequential AID values.

Although the invention has been described and illustrated with a certain degree of particularity, it is understood that the present disclosure has been made only by way of exemplary embodiments, and that numerous changes in the combination and arrangement of elements can be resorted to by those skilled in the art without departing from the spirit and scope of the invention, as hereinafter claimed.

We claim:

1. A method of operating a communication network which comprises an access point (AP) and in communication with a plurality of stations (STAs) each having an Association Identifier (AID) and which uses frame-based communications, the method comprising:
    organizing the STAs into groups so that each group has a distinct awaken time;
    organizing each group to have its own awaken beacon interval to receive a traffic information map;
    matching the traffic information map of a group with an Wakeup Target Beacon Transmit Time (TBTT) of the group;
    transmitting within a beacon frame an Extended traffic indication map comprising a 3-octet Bitmap Control field having a Count Field indicating a remaining number of beacon intervals until the AP transmits a next beacon frame and a Period field indicating the length in beacon intervals of a traffic indication map period; and
    wherein the STAs are organized so that the AIDs of the STAs within a group form a sequence and are geographically positioned so that STAs within a group detect each other's transmissions and the STAs in a group have power save requirements that are defined by a STA type as sensor or off-loading.

2. The method of claim 1, wherein organizing the STAs into groups results in each STA being in one of the groups.

3. The method of claim 1, wherein the group to which the Extended traffic indication map is directed is indicated in a Group ID subfield in the 3-octet Bitmap Control field of the Extended traffic indication map.

4. The method of claim 1 further comprising including group management information in a Group Power Save Element and transmitting the Group Power Save Element by the AP to a group in at least one of an Association Response, a beacon, a Probe Response or a Group Power Save Management action frame.

5. The method of claim 4 wherein the information in the Group Power Save Element comprises a Starting AID and an Ending AID of the group, a Group Sleeping Interval and a Group Wakeup TBTT of the group.

6. The method of claim 4, wherein the Group Power Save Management action frame comprises a Category field, an Action Value field and a plurality of Group Power Save Elements.

7. A system for a communication network comprising:
    an access point (AP) device in communication with a plurality of stations (STAs) each having an Association Identifier (AID);
    wherein the communications between the AP and STAs are organized as beacon frames;
    wherein the STAs are organized into groups;
    wherein the communications from the AP to the STAs comprise an Extended traffic identification map comprising a 3-octet Bitmap Control field having a Count field indicating a remaining number of beacon intervals until the AP transmits a next beacon frame and a Period field indicating the length in beacon intervals of a Traffic indication map period, wherein the all STAs of a group have the same scheduled wake up times;
    wherein the Extended traffic identification map of a group is matched with an Wakeup Target Beacon Transmit Time (TBTT) of the group; and
    wherein the STAs are organized so that the AIDs of the STAs within a group form a sequence and are geographically positioned so that STAs within a group detect each other's transmissions and the STAs in a group have power save requirements that are defined by a STA type as sensor or off-loading.

8. The system of claim 7, wherein organizing the STAs into groups results in each STA being in one of the groups.

9. The system of claim 7 wherein the group to which an Extended traffic indication map is directed is indicated in a Group ID subfield in the 3-octet Bitmap Control field of the Extended traffic indication map.

10. The system of claim 7 further comprising including group management information in a Group Power Save Element and transmitting the Group Power Save Element by the AP to a group in at least one of an Association Response, a beacon, a Probe Response or a Group Power Save Management action frame.

11. The system of claim 10 wherein the information in the Group Power Save Element comprises a Starting AID and an Ending AID of the group, a Group Sleeping Interval and a Group Wakeup Target Beacon Transmit Time (TBTT) of the group.

* * * * *

UNITED STATES PATENT AND TRADEMARK OFFICE
CERTIFICATE OF CORRECTION

PATENT NO.       : 9,326,234 B2
APPLICATION NO.  : 13/710282
DATED            : April 26, 2016
INVENTOR(S)      : Chu et al.

It is certified that error appears in the above-identified patent and that said Letters Patent is hereby corrected as shown below:

In the Claims

Column 7, Line 48,    Delete: "information"
Claim 1               Insert --indication--

Column 7, Line 49,    Delete: "information"
Claim 1               Insert --indication--

Column 8, Line 30,    Delete: "identification"
Claim 7               Insert --indication--

Column 8, Line 37,    Delete: "identification"
Claim 7               Insert --indication--

Signed and Sealed this
Twenty-eighth Day of June, 2016

Michelle K. Lee
*Director of the United States Patent and Trademark Office*